Nov. 1, 1960 S. M. VOLK 2,958,820
MOISTURE METER
Filed Oct. 7, 1955
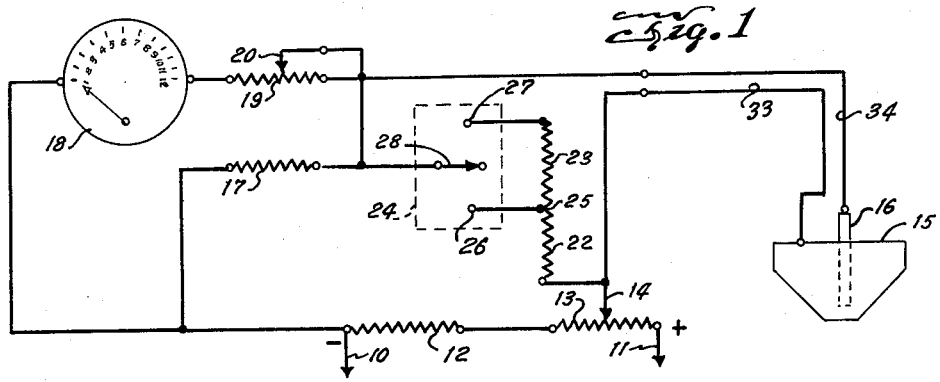
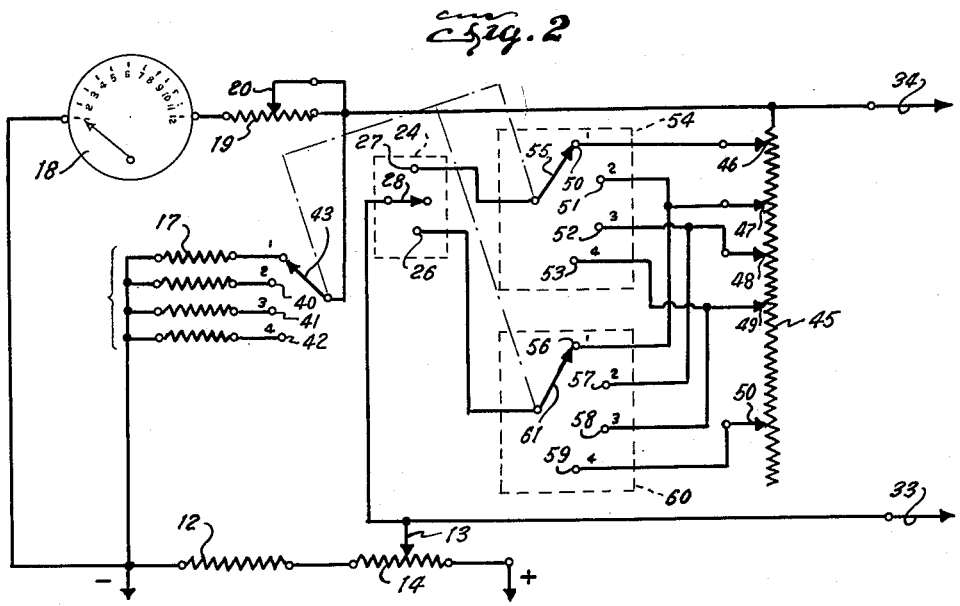
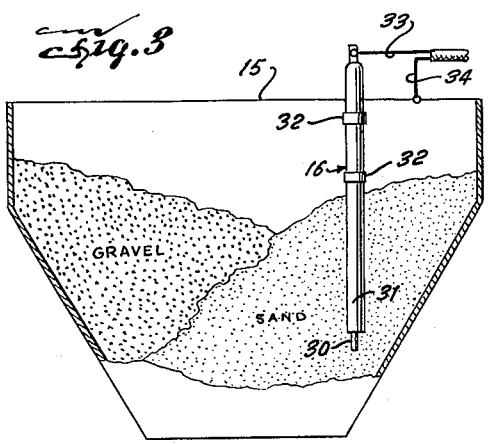
Stuart M. Volk
INVENTOR.
BY
ATTORNEY

2,958,820

MOISTURE METER

Stuart M. Volk, 8915 Harry Hines Blvd., Dallas, Tex.

Filed Oct. 7, 1955, Ser. No. 539,151

1 Claim. (Cl. 324—65)

This invention relates to moisture measuring devices and more particularly to a moisture measuring device for indicating the amount of moisture in sand, gravel, grain or the like.

An object of the invention is to provide a new and improved device for measuring surface moisture in sand or the like.

Another object of the invention is to provide a moisture measuring device, of the type described above, having an electric circuit for indicating the amount of surface moisture in material such as in a weighing hopper used to weigh batches of sand to be used in making concrete.

Still another object of the invention is to provide a moisture measuring device, of the type described above, wherein the electric circuit includes an electrode which is disposed within the hopper, the hopper itself serving as the other electrode, between which electrodes current may flow.

A further object is to provide a moisture measuring device, of the type described above, wherein the electric circuit has adjusting means whereby the circuit may be adjusted to provide proper linearity of moisture indication in any installation.

A still further object of the invention is to provide a moisture measuring device, of the type described above, having a further adjusting means to adapt it for use with materials whose surface moistures have widely varying conductivities due to differences in electrolysis qualities.

Other objects will appear as the description proceeds when considered with the annexed drawing, wherein:

Figure 1 is a diagrammatic illustration of the device for measuring surface moisture in sand or other material in a hopper or other container.

Figure 2 is a diagrammatic illustration of a modified form of the electrical circuit.

Figure 3 is a side elevation of a weigh hopper with one side partially broken away, showing the manner in which the electrode is mounted within the hopper.

Referring more particularly to Figure 1 of the drawing, the moisture measuring device includes an electrical circuit having direct current input terminals 10 and 11 across which are connected in series a high value resistance 12 and a high value adjusting rheostat 13. The control 14 of the high value adjusting rheostat 13 is connected directly to the hopper 15 which is of course constructed of steel or other electrically conductive material whereby the positive input terminal 11 is connected to the material in the hopper 15 through the rheostat 13.

The electrode 16 which is disposed in the hopper 15 to contact the material contained therein is connected to the negative input terminal 10 through a low value resistance 17. A milliammeter 18 is connected in series with a variable resistance 19 across the low value resistance 17. The effective value of the variable resistance 19 may be adjusted by moving its control 20.

It will now be apparent that when a substantially constant or regulated direct current voltage is applied across the input terminals 10 and 11, current will flow from the input terminal 16 through the rheostat 13 to the hopper 15, through the material in the hopper to the electrode 16 and thence through the low value resistance 17 to the input terminal 10. It will be evident that the amount of current flowing in this described circuit will depend upon the amount of surface moisture present in the sand or other material in the hopper, the greater the amount of surface moisture, the greater the current flowing. The milliammeter 18 being connected across the resistance 17 in series with the variable resistance 19 indicates the amount of current flowing and thus also the amount of moisture in the material. The scale of the meter may be marked to indicate directly the percentage of surface moisture.

Inasmuch as the characteristics of each installation may vary rendering the readings of the meter somewhat inaccurate and unlineal, a presetting or calibrating means has been provided which includes a pair of serially connected resistances 22 and 23 and a presetting switch 24. One end of the resistance 22 is connected to the control 14 of the high value adjusting rheostat 13 while its opposite end is connected, as at 25, to one end of the resistance 23 and to the stationary contact 26 of the switch 24. The opposite end of the resistance 23 is connected to the stationary contact 27 of the switch 24. The movable contact 28 of the switch 24 is in normally open position out of contact with either of its stationary contacts 26 and 27 and is connected to the low value resistance 50 and the variable resistance 19, as shown.

To present or calibrate the device at the installation, the contact 28 of switch 24 is moved to the stationary contact 27 connecting both resistances 22 and 23 in series between the rheostat 13 and the low value resistance 17. The hopper 15 is of course empty. With both resistances 22 and 23 connected in series in the circuit, the meter should read a predesignated low value, say 4, on its scale. If it does not, the contact 20 of the variable resistance 19 is moved until the meter reads 4. The movable contact 28 of the switch 24 is then moved to stationary contact 26 connecting only the resistance 22 in series with the low value resistance 17. The meter should now read a predesignated high value, say 8, on its scale. If it does not, the contact 14 of the rheostat 13 is adjusted until the meter reads 8. By so adjusting high and low readings of the meter, linearity of measurement at any installation will be insured.

Several moisture tests are then taken on different batches of material in the hopper and the amounts of moisture contained in these trial batches as indicated by the meter is compared to the actual amounts of moisture preset, as determined by cooking the moisture out of the batches or any other satisfactory method. If it is determined that the meter reads a half percent low, the variable resistance 19 is adjusted to cause the meter to read 4.5 on its scale when the movable contact 28 of the switch 24 contacts the stationary contact 27 and the movable contact 14 is adjusted to cause the meter to read 8.5 when the movable contact 28 of the switch 24 contacts the stationary contact 26. The meter will then read correctly and linearly throughout its full scale.

The electrode 16 (Figure 2) may be comprised of a brass rod 30 welded in a pipe 31 which is coated with a non-conductive material. The electrode is supported in the hopper and is secured thereto by brackets 32. The brass rod extends through the pipe and a conductor is connected to its upper end which connects it to the low value resistace 17 and the variable resistance 19. The conductor 34 connects the hopper to the contact 14.

It has been found that the characteristics of materials such as sand and water vary from one area to another so that the degree of electrical conductivity of different batches of sand having the same percentages of moisture may vary greatly, making necessary in such instances a greater degree of adjustability of the moisture measuring device than can be obtained with the circuit shown in Figure 1. The circuit shown in Figure 3 obtains this greater adjustability by providing additional resistances 40, 41 and 42 which can be selectively connected in series with the electrode 16, instead of only the resistance 17, by means of the movable contact 43. The resistances 40, 41 and 42 have progressively greater values. A rheostat 45 is used in place of the resistances 22 and 23 and is provided with a plurality of movable contacts 46 through 50. The movable contacts 46 through 49 are connected to the stationary contacts 50 through 53, respectively, of a switch 54 whose movable contact 55 is connected to the stationary switch 24. The movable contacts 47 through 50 are connected to the stationary contacts 56 through 59, respectively, of a switch 60 whose movable contact 61 is connected to the stationary contact 26 of the presetting switch 24.

The movable contacts 43, 55 and 61 are mechanically linked together to move simultaneously. The movable contacts 46 through 50 are preset at the factory to correspond to the values of the resistances 17, 40, 41 and 42 so that the linearity of readings will not be affected whatever the position of the movable contact 43.

It will be apparent that in areas where the conductivity of the water is relatively low the movable contact will be kept in position 1 so that the lowest value resistance 17 is connected in series with the electrode 16. The movable contacts 55 and 61 will be in their positions 1 also. If the conductivity of the moisture is greater, the movable contact 43 may be moved progressively to its other positions 2, 3 and 4 connecting progressively greater resistances 40, 41 and 42 in series with the electrode 16. The contacts 55 and 61 will, of course, simultaneously move to their positions 2, 3 and 4 since they are mechanically connected thereto. The method of presetting the meter by use of the presetting switch 24 will remain the same as in the circuit shown in Figure 1.

It will now be seen that a new and improved moisture measuring device has been illustrated and described which employs an electric circuit to determine the amount of moisture in material in a container by using the container as an electrode and supporting another electrode within the container, the amount of current passing between the electrodes being an indication of the amount of moisture in the material in the container.

It will also be apparent that the electric circuit is provided with means for presetting or adjusting the meter readings at the installation to insure linearity throughout the range of the meter readings. It will also be seen that in one embodiment of the device a selector means has been provided which permits easy adjustment of the device for use with material whose surface moistures have widely varying electrical conductivities.

Manifestly, the construction as shown and described is capable of some modification and such modification as may be construed to fall within the scope and meaning of the appended claim is also considered to be within the spirit and intent of the invention.

What is claimed is:

A device for measuring moisture in a material in a container comprising an electrode insertable into the container, and an electric circuit comprising input terminals, a resistance connected across said terminals having a movable contact connected to said container, a plurality of resistances selectively connectable in series with said electrode, and a meter and a variable resistance connected in series across the resistance of said plurality of resistances connected in series with said electrode, and means for selectively connecting pre-selected resistances between said movable contact and said container whereby low and high readings of the meter may be preset to insure linearity, and means presetting said pre-selected resistances for connection between said movable contact and said container in accordance with the resistances selectively connected in series with said electrode.

References Cited in the file of this patent

UNITED STATES PATENTS

| | | |
|---|---|---|
| 1,670,640 | Smith | May 22, 1928 |
| 1,826,247 | Heppenstall | Oct. 6, 1931 |
| 1,912,188 | Gann | May 30, 1933 |
| 1,930,831 | Webb | Oct. 17, 1933 |
| 2,548,410 | Tyson | Apr. 10, 1951 |
| 2,673,327 | Morelock | Mar. 23, 1954 |
| 2,692,368 | Mohier | Oct. 19, 1954 |